United States Patent [19]
Taylor et al.

[11] 4,212,469
[45] Jul. 15, 1980

[54] DISC RECORD PLAYERS

[75] Inventors: Brian P. Taylor, Swindon; David J. Davis, Wroughton; Roy N. Wasdell, Wolverhampton, all of England

[73] Assignee: Plessey Handel und Investments AG., Zug, Switzerland

[21] Appl. No.: 910,859

[22] Filed: May 30, 1978

[30] Foreign Application Priority Data

Jun. 3, 1977 [GB] United Kingdom ............... 23708/77

[51] Int. Cl.² .............................................. G11B 3/38
[52] U.S. Cl. ................................................. 274/23 A
[58] Field of Search ................. 274/23 A, 23 R, 9 RA

[56] References Cited
U.S. PATENT DOCUMENTS

| | | | |
|---|---|---|---|
| 2,235,301 | 3/1941 | Robinson | 274/9 RA |
| 3,212,074 | 10/1965 | Daniels et al. | 274/9 RA |
| 3,993,315 | 11/1976 | Hansen | 274/39 A |
| 4,135,086 | 1/1979 | Baba | 274/23 A |

Primary Examiner—Steven L. Stephan
Attorney, Agent, or Firm—Fleit & Jacobson

[57] ABSTRACT

A disc record player comprising a pickup arm, electrical position-responsive means for providing an electrical signal that is dependent upon the position of the pickup arm, electrical reference means for affording one or more reference signals corresponding to one or more required positions of the pickup arm, comparator means for comparing the electrical signal from the electrical position-responsive means with a selected reference signal from the electrical reference means and for generating a command signal which is effective to cause the pickup arm to move to a position corresponding to the said required position.

6 Claims, 3 Drawing Figures

DISC RECORD PLAYERS

This invention relates to disc record players.

In disc record players, it would be advantageous to provide an electrical system rather than the conventionally used mechanical systems for pickup arm positioning. It is an aim of the present invention to provide a disc record player having such an electrical system.

Accordingly this invention provides a disc record player comprising a pickup arm, electrical position responsive means for providing an electrical signal that is dependent upon the position of the pickup arm, electrical reference means for affording one or more reference signals corresponding to one or more required positions of the pickup arm, comparator means for comparing the electrical signal from the electrical position-responsive means with a selected reference signal from the electrical reference means and for generating a command signal which is effective to cause the pickup arm to move to a position corresponding to the said required position.

The disc record player may be of the radial arm type or of the tangential tracking arm type.

The electrical position responsive means may comprise a wiper moving along a carbon track. The electrical reference means may comprise push buttons with latching circuits, e.g. M.O.S. switches. The comparator means may comprise a differential amplifier.

The record player may comprise visual indicator means for visually indicating the position of the pickup arm. The visual indication may be effected mechanically e.g. by means of a light source or pointer and a scale which are movable relative to one another or electronically from the electrical signal that is dependent upon the position of the pickup arm. Conveniently the electrical signal may be used to afford an analogue indication of pickup arm position by applying it to, for example a moving coil meter. The electrical signal may also be used to afford a digital indication by making use of analogue-to-digital converter means operable on the electrical signal for driving digital display means, for example in the form of a seven segment light emitting diode display or a liquid crystal display.

In one embodiment of the invention, the position responsive means comprises potential divider means for deriving a variable voltage signal that is dependent upon the pickup arm position, the potential divider means conveniently comprising a fixed potential divider, for example the above mentioned carbon track having a contacting wiper that is moved thereon in concert with the pickup arm, the contacting wiper affording the variable voltage signal that is dependent upon the pickup arm position.

The electrical reference means may afford one or more reference signals corresponding, for example, to a rest position, a 12" record start position, a 7" record start position, a 12" record end-of-record position and a 7" record end-of-record position.

Preferably, the record player includes a motor driven carriage which carries the pickup arm and which is adapted to be moved so as to maintain the pickup in a fixed relationship to a record on the record player, a first servo-controlled arrangement for energising the motor driven carriage whilst the pickup arm is in contact with a record being played, and second servo-controlled arrangement responsive to the electrical signal that is dependent upon the position of the pickup arm and to a said reference signal to cause the pickup arm to move to the position corresponding to the said required position when the pickup arm is not in contact with a record being played. Advantageously, the record player is such that the electrical signal from the electrical position-responsive means is fed to the first servo-controlled arrangement for effecting velocity and/or acceleration feedback control of the pickup arm.

An embodiment of the invention will now be described solely by way of example and with reference to the accompanying drawings, in which.

In the following description, the present invention will be described as applied to a tangential tracking arm type disc record player, of the kind that forms the basis of our co-pending U.S.A. patent application No. 831,169, now abandoned. In such a disc record player, the pickup arm is mounted on a carriage which is moved along a track means of a linear actuator or motor. It will be appreciated however that the present invention has much wider application and that it is applicable to radial arm type disc record players as well as to tangential tracking arm type disc record players.

Figure 1:
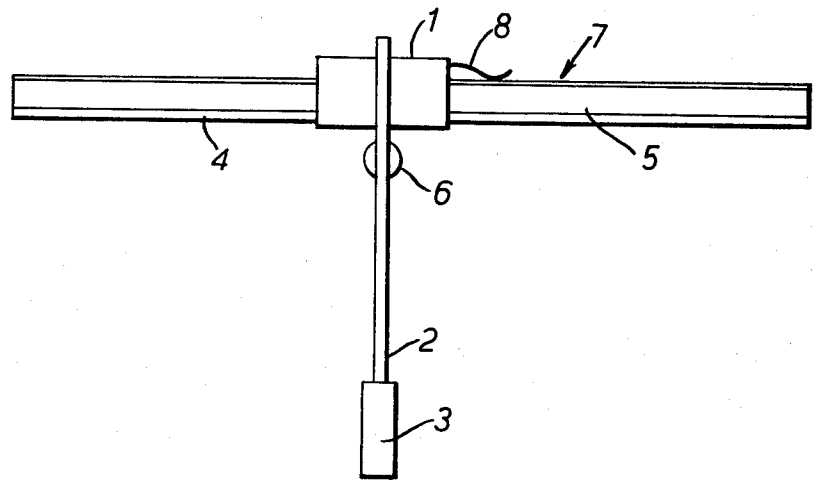
FIG. 1 is a plan view of a pickup arm and carriage arrangement of a tangential tracking pickup arm type disc record player in accordance with the present invention.

Referring to FIG. 1, there is depicted a pickup arm arrangement for use in a tangential tracking arm type disc record player of the kind that forms the basis of the aforesaid co-pending patent application. The pickup arm arrangement shown comprises a carriage 1 on which is mounted a pickup arm 2 carrying a stylus holder 3 at its free end, the carriage 1 being movable along a track 4 by means of a linear motor or actuator 5 of the kind described in the aforesaid co-pending patent application. The pickup arm 2 is mounted on the carriage 1 so that it is pivotally movable vertically (perpendicular to the plane of the draawing as viewed in FIG. 1) under the control of a cueing platform 6 and is pivotally movable in a transverse direction, and error correction arrangement (not shown) being provided. Preferably, the error correction arrangement is an optical error correction arrangement. When the stylus of the pickup arm 2 contacts a record and the pickup arm is moved from its normal (tangential) position, this movement is sensed and is used in a servo-control mode to energise the linear motor 5 so causing the carriage 1 to be moved along the track 4 so as to maintain the pickup arm 2 very nearly tangential to the record being played over the whole of its travel.

In order to provide an output indication of pickup arm position, either for affording a visual indication of arm position or for pickup arm positioning purposes, the track 4 of the arrangement of FIG. 1 is provided with a carbon track 7 which is connected in the form of a potential divider and which is provided with a contacting wiper 8. The wiper 8 is attached to the carriage 1. Thus, as the carriage 1 is moved along the track 4, the wiper 8 is caused to move along the carbon track 7 and affords an output voltage which is dependent upon the position of the carriage 1 relative to the track 4 and is thus dependent upon the relative position of the pickup arm 2.

Figure 2:
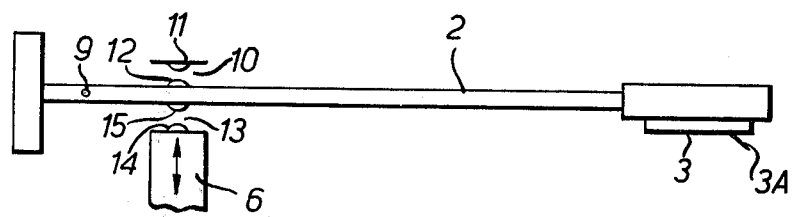
FIG. 2 shows the pickup arm of FIG. 1 in side view.

In FIG. 2 of the drawings, there is shown a side view of part of the pickup arm arrangement of FIG. 1 in which the pickup arm 2 is shown together with the stylus holder or headshell 3 and a stylus 3A. The pickup arm 2 is provided with a horizontally disposed pivot 9 which permits vertical movement of the pickup arm 2 under the control of the cueing platform 6. Associated also with the cueing platform 6 and the pickup arm 2 are two pairs of switch contacts. The first pair of switch contacts 10 comprise a fixed "upswitch" contact 11 and an upper contact on the pickup arm 2, these two contacts being arranged to be closed when the pickup arm 2 is in its fully 'up' position. The second pair of switch contacts 13 comprise a "downswitch" contact 14 mounted on top of the cueing platform 6 and a lower contact 15 on the pickup arm 2, the contacts 14, 15 being open when the pickup arm is in its fully "down" position.

Figure 3:
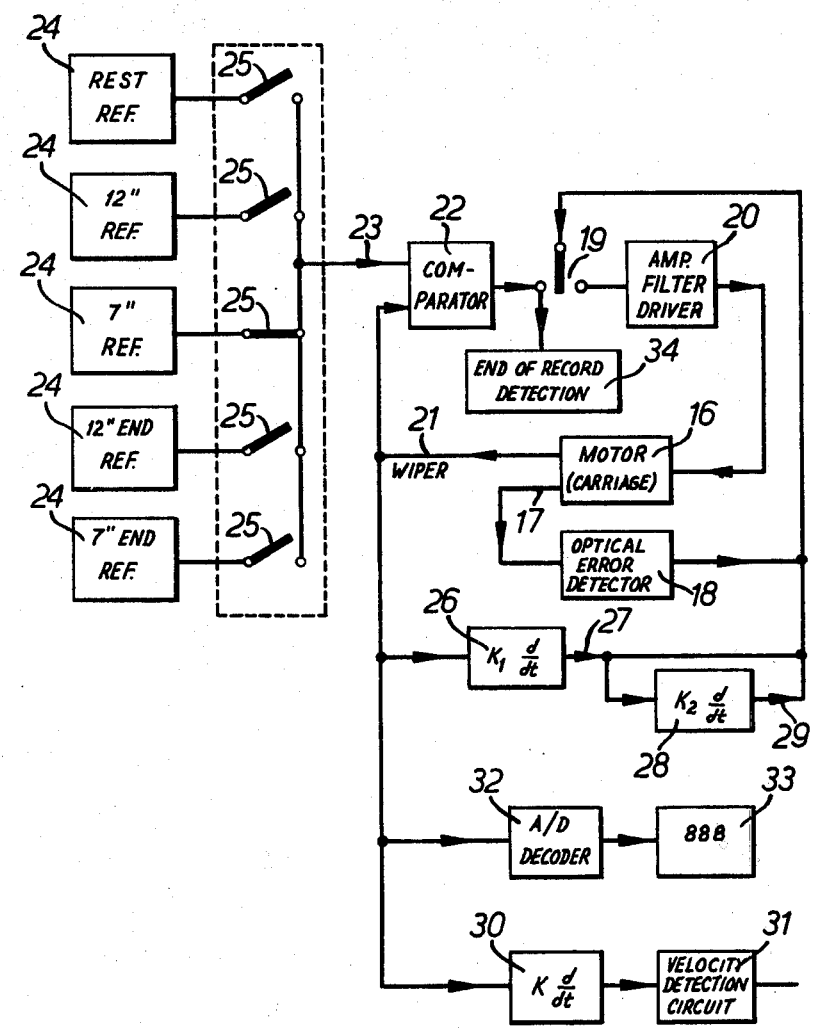
FIG. 3 is a block schematic diagram of a servo control system for use in a disc record player in accordance with the present invention.

In FIG. 3 of the drawings, there is shown a block schematic diagram of a servo-control system for use in a disc record player that incorporates the pickup arm arrangement described with reference to FIGS. 1 and 2.

In the block schematic diagram of FIG. 3, the linear motor 5 associated with the carriage 1 of the arrangement of FIG. 1 is shown at 16, an output 17 from which corresponds to the optical error signal which is applied to an optical error detector 18. The output from the error detector 18 is fed via a changeover switch 19 to an amplifier/filter drive circuit 20 which energises the motor 16 in an effort to reduce the error signal 17 to zero. Thus a first servo-control loop is set up which is used to drive the carriage when the pickup arm stylus is in contact with a record being played as detected by the second pair of switch contacts 13 in FIG. 2.

In addition to the optical error signal 17, the linear motor 16 affords a wiper output 21 which corresponds to the output afforded by the wiper 8 of the arrangement of FIG. 1. The wiper output 21 is applied to a comparator 22 in which it is compared with a reference signal 23 derived from one of five positional references 24 via respective selector switches 25. Typically, the positional references 24 be afforded by individual settable potential dividers that are set to correspond to, for example, a rest position, a 12" record start position, a 7" record start position, a 12" record end-of-record position, and a 7" record end-of-record position. The output of the comparator is applied via the changeover switch 19 to the amplifier/filter drive circuit 20 to energize the motor 16 to cause it to move so as to reduce the output from the comparator 22 to zero. Thus a second servo-control loop is set up which is used to drive the carriage 1 to position the pickup arm 2 when the pickup arm 2 is in its fully raised position as detected by the switch contacts 10 in FIG. 2.

When the changeover switch 19 is selected so that the output of the optical error detector 16 is selected, i.e. the first servo-control system is selected, the output from the comparator 22 may be applied to an end-of-record detection circuit 34 which detects when an end of record position as defined by a selected one of the reference signals 24 has been reached.

As well as being used for positional control in the second servo-control loop, the wiper output 21 may be used in conjunction with the output from the optical error detector 18 to provide velocity and/or acceleration feedback control, this being achieved by differentiating the wiper output by means of a first differentiator 26 to afford a velocity control signal 27 and a second differentiator 28 operable on the output of the first differentiator 26 to afford an acceleration control signal 29, the control signals 27 and 29 being suitably combined with the output of the optical error detector 18 so as to limit speed of operation of the first servo-control loop. Although not shown the velocity and/or acceleration feedback control signals may also be used in conjunction with the second servo-control loop.

The wiper output 21 from the linear motor 16 may also be used to detect when movement of the pickup arm has ceased to ensure that no vertical movement of the pickup arm is effected whilst it is being moved transversely. This may be accomplished by differentiating the wiper output 21 in a further differentiator 30 the output of which is applied to a velocity detection circuit 31 which affords an output when the arm velocity is zero.

In addition, the wiper output 21 may be used to afford a visual indication of arm position by applying it to an analogue-to-digital converter 32, the output from which is used to drive a suitable e.g. 3 digit, seven segment light emitting diode display or a liquid crystal display 33 which affords a digital indication of arm position. By suitable arrangement of circuitry, it can be arranged that the digital display 33 registers 000 at the start of a 7" or 12" record, so that the count increases as the pickup arm traverses inwards. The display may be blanked prior to 000 being registered or arranged that 000 is displayed until the start of a record is reached.

The embodiment of the invention described with reference to the accompanying drawings has been given by way of example only and it should be appreciated that some modification of the arrangement described may be made without departing from the scope of the invention. For example the variable voltage dependent upon pickup arm position afforded by the carbon track 7 and wiper 8 may be derived by any suitable means such for example as an optical wedge type arrangement. Instead of providing individual potential dividers for the reference positions 24, these may be derived by providing additional tappings on the carbon track 7. Instead of using the analogue output afforded by the wiper 8 of FIG. 2 to drive a digital display, it may be applied, for example, to a moving coil meter to afford an analogue output indication. Additionally, instead of deriving the visual indication electronically as described, it may be derived mechanically by using a light source or pointer and a scale which are movable relative to one another or by differentiating the wiper output and using the differentiated output to energise a motor which drives a multi-digit revolving 0 to 9 number display. Additionally, it is envisaged that use may be made of the digital display of arm position by providing a remote control unit whereby a required pickup arm position may be selected remotely by "dialling-in" a required number and the arrangement described arranged so that the pickup arm is moved to the required position. Also a memory system may be provided so that preselected arm positions may be memorised and subsequently selected by suitably addressing the memory.

What we claim is:

1. A disc record player comprising a pickup arm, electrical position responsive means for providing an electrical signal that is dependent upon the position of the pickup arm, electrical reference means for affording one or more reference signals corresponding to one or more required positions of the pickup arm, comparator means for comparing the electrical signal from the electrical position responsive means with a selected reference signal from the electrical reference means and for generating a command signal which is effective to cause the pickup arm to move to a position corresponding to the said required position, a motor driven carriage means for carrying said pickup arm which is movable for maintaining the pickup arm in a fixed relationship to a record on the record player, a first servo-controlled means for energising the motor driven carriage means when the pickup arm is in contact with a record being played, and second servo-controlled means responsive to the electrical signal that is dependent upon the position of the pickup arm and to said reference signal for moving the pickup arm to the position corresponding to said required position when the pickup arm is not in contact with a record being played, the first servo-controlled means comprising feedback control means for controllling the velocity and/or acceleration of the pickup arm, said feedback control means being interconnected between said electrical position responsive means and said motor driven carriage means for effecting velocity and/or acceleration feedback control of the pickup arm, said feedback control means including first and second differentiator means for providing velocity and acceleration feedback control of the pickup arm, the first differentiator means affording a velocity control signal and the second differentiator means affording an acceleration control signal.

2. A disc record player according to claim 1 in which the electrical position-responsive means comprises a wiper moving along a carbon track.

3. A disc record player according to claim 1 or claim 2 in which the electrical reference means comprises push buttons with latching circuits.

4. A disc record player according to claim 1 including pickup arm-movement-detection differentiator means having its input interconnected with said electrical position responsive means and having its output interconnected with a velocity detection circuit.

5. A disc record player according to claim 1 including an analogue-to-digital converter having its input interconnected with said electrical position responsive means and having its output interconnected with a display means for affording a digital indication of arm position.

6. A disc record player according to claim 1 wherein said comparator means comprises a differential amplifier.

* * * * *